United States Patent [19]

Michalski et al.

[11] 4,002,490

[45] Jan. 11, 1977

[54] PAINT SPRAY BOOTH CHEMICAL TREATMENT

[75] Inventors: Raymond J. Michalski, Riverdale; Alan H. Fisher, Calumet City, both of Ill.

[73] Assignee: Nalco Chemical Company, Oak Brook, Ill.

[22] Filed: Feb. 20, 1975

[21] Appl. No.: 551,806

[52] U.S. Cl. .................................. 134/38; 55/84; 55/87

[51] Int. Cl.$^2$ .......................................... B08B 3/08

[58] Field of Search ............ 134/13, 38; 55/84, 85, 55/87, 89; 252/358, DIG. 1; 210/54 R, 58; 98/115 SB

[56] References Cited

UNITED STATES PATENTS

| | | | |
|---|---|---|---|
| 2,575,276 | 11/1951 | Jacoby et al. | 252/358 X |
| 2,668,150 | 2/1954 | Luvisi | 252/358 X |
| 2,928,498 | 3/1960 | Nisoli et al. | 55/87 |
| 3,429,823 | 2/1969 | Cataneo | 134/38 X |
| 3,635,827 | 1/1972 | Jakobi | 252/358 X |
| 3,671,465 | 6/1972 | Murphy | 134/38 X |
| 3,861,887 | 1/1975 | Forney | 55/85 X |

*Primary Examiner*—Robert L. Lindsay, Jr.
*Assistant Examiner*—Marc L. Caroff
*Attorney, Agent, or Firm*—John G. Premo; Robert A. Miller; Barry W. Sufrin

[57] ABSTRACT

Polypropylene glycols having an average molecular weight of from 100 to 1,000 have been found useful in increasing the operational efficiency of paint and lacquer detackifying compositions consisting of a cationic polymer and the water-soluble salt of an amphoteric metal used in paint and lacquer spray booth applications.

3 Claims, No Drawings

PAINT SPRAY BOOTH CHEMICAL TREATMENT

BACKGROUND

In the application of paints and lacquers to automobile bodies and other types of articles it is customary to carry out such operations in enclosed spray booths and to introduce into such spray booths a curtain of water to wash the air and to remove over-sprayed paints or lacquer solids. The water containing suspended solids is filtered or otherwise treated to separate the solids so that the water can be recycled.

The paint and lacquer solids, which are washed away and form suspension in the water that is removed from the spray booths present a disposal problem. In order to avoid contamination of the environment it is customary to separate these solids from the water and to recirculate the water. These solids are difficult to separate by the usual methods of filtration.

This process involves many problems. Thus, the paint and lacquer solids are normally tacky and tend to adhere to the walls, ceilings and floors of the spray booths which makes it necessary to shut down the operation from time to time in order to clean the spray booths. The deposits which are formed on the walls, ceilings and floors of the spray booths are also subject to the growth of anaerobic corrosive bacteria (e.g., Desulfovibrio) which generate corrosive and highly objectional hydrogen sulfide.

Recently, chemical compositions have been provided which when added to the water used to wash the air and to remove over-sprayed paints and lacquers will detackify the paint and lacquer particles. These chemical compositions usually consist of a blend of water-soluble salt of an amphoteric metal and a polycationic water dispersible polymer, and are more fully disclosed in U.S. Pat. No. 3,861,887 which is hereinafter incorporated by reference.

While these compositions have generally been effective in detackifying and removing over-sprayed paint, there has been a serious need to increase the efficiency of this process so that the booths can remain in longer use before normal cleaning operations and allow a better quality of waste water to be discharged from the washing operations. It would, therefore, be desirable to increase the operational efficiency of these blends so as to shorten the time necessary for the removal of paint and lacquer sludge and to increase productivity.

OBJECTS

One of the objects of the present invention is to provide to the art an improved process for the clarification and detackification of paint and lacquer spray booth wastes.

Another one of the objects of this invention is to provide to the art a composition useful for the clarification and detackification of paint spray booth wastes in processes of the type in which water is used to wash the air in the spray booth and to remove over-sprayed paint or lacquers with the use of a polycationic water dispersible polymer in combination with a water-soluble electrolyte salt of an amphoteric metal.

Another object of this invention is to provide an improved composition useful for the detackification and clarification of paint spray booth wastes of the type described above by the addition thereto of a polypropylene glycol having a molecular weight of from 100 to 1,000.

A further object of this invention is to provide a process of the type described above characterized by adding to the water containing the water soluble salt of an amphoteric metal and a water dispersible polycationic polymer at an alkaline pH, a polypropylene glycol having a molecular weight of from 100 to 1,000 so as to greatly improve the efficiency of the paint waste clarification and detackification processes.

BRIEF SUMMARY OF THE INVENTION

In accordance with the invention, pollution and contamination in paint or lacquer spray booths in which water is used to wash the air in the spray booth and to remove over-sprayed paint or lacquer solids are controlled by adding to the water a blend of a polycationic water dispersible polymer, a compatible water soluble salt of an amphoteric metal, and a polypropylene glycol having a molecular weight of from 100 to 1,000, preferably while maintaining a pH within the range of 7.0 to 11.0, the quantity of said blend being sufficient to reduce the tackiness of paint and lacquer solids and to condition such solids so that they can be separated from the water, e.g., by filtration, so that the water can be returned for recycling in the process.

THE PAINT DETACKIFYING COMPOSITIONS

In a process of the type described, the conventional paint or lacquer spray booth is a closed room where the object to be painted or lacquered is sprayed with paint or lacquer and the air is washed with a curtain or spray of water so as to remove over-sprayed paints or lacquers in the form of suspensions of paint or lacquer solids. These suspensions can be disposed of as waste materials but in order to avoid contamination of the environment, it is desirable to separate the solids and to reuse the water. Unfortunately, the paint or lacquer solids are quite tacky and despite air washing with water, they tend to build up in the form of deposits on the walls, ceilings and floors of the spray booths. In a typical operation a run might last for 2 weeks and at the end of that time the spray booth has to be emptied and cleaned. The cleaning might require 200 man hours. Furthermore, the sludge which is produced during the operation of the spray booth as a result of the combination of the water with the paint or lacquer solids is usually very difficult to de-water by the customary filtration methods. In addition, the accumulation of the paint or lacquer deposits on the walls, ceilings and floors of the spray booths provides a suitable environment for anaerobic corrosive bacteria.

The addition of a blend of polycationic, water dispersible polymer and a compatible salt of an amphoteric metal to the water used in washing the air in the spray booth has been found to reduce the tackiness of paint and lacquer solids, thereby reducing the tendency of over-sprayed paints and lacquers to adhere to walls, ceilings and floors of the spray booths and at the same time conditions the solids so that they can be readily removed from the water after the suspension of solids in water has been removed from the spray booths.

The separation of the solids from the water can be effected by vacuum filtration or in any other suitable manner and the filtrate can then be used over again in the process.

While the above processes employing the above compositions has been found to provide satisfactory detackification of paint and lacquer particles, the efficiency of these materials is not as great as it could be.

We have found that by the addition of from 1-30 ppm of a polypropylene glycol, having a molecular weight of from 100 to 1,000 to the paint spray booth system containing the cationic polymer and compatible salt of an amphoteric metal the operational efficiency of these types of processes can be increased drastically. This can be done at lower chemical cost and yields a higher saving in efficiency, due to the fact that less down time is needed in the detackification and clarification process.

THE POLYCATIONIC WATER DISPERSIBLE POLYMERS

The polycationic water dispersible polymers which are of the type employed in the practice of the invention are of well known types having a linear carbon chain to which is attached a plurality of cationic groups such as, for example, amino and quaternary amino groups. Polymers which have been found to be effective usually have a molecular weight within the range of 200 to 5,000. Examples of such polymers which are compatible with water soluble salts of amphoteric metals are the polycondensates having a molecular weight of at least 1000 of epichlorohydrin and precondensates of polyalkylene polyamines and polyoxyalkylene glycol chlorides as disclosed in U.S. Pat. No. 3,251,882, the disclosure of which is incorporated herein by reference, and polyethylene polyamines as disclosed in U.S. Pat. No. 3,751,474, the disclosure of which is incorporated herein by reference. Other suitable polycationic linear polymers are condensation products of ammonia and ethylene dichloride and condensation products of ethylene diamine and ethylene dichloride and the quaternary salts thereof as disclosed in U.S. Pat. No. 3,372,129, the disclosure of which is incorporated herein by reference. Suitable polycationic linear polymers for the purpose of the invention are also obtained by the polymerization of polyethylene glycol and hexamethylenediamine. Similar polycationic water dispersible polymers having a linear main carbon chain with a plurality of cationic groups attached thereto which are compatible with water soluble salts of amphoteric metals can be employed for the purpose of the invention.

Other useful cationic agents which will perform in our invention and are considered polymers for the purpose of our invention include substituted amines having at least two primary amine groups and having at least three carbon atoms. Examples of compounds in this class include dipropylene triamine, hexamethylamine diamine, hexamethylene triamine and tetraethylene pentamine. Additionally, it may sometimes be desirable to use crude distillation bottoms or overheads containing these materials such as bottoms from the distillation of hexamethylene diamine.

Also, the linear polyamine polymers of low molecular weight disclosed in U.S. Pat. No. 3,468,818 may be used in the practice of the present invention, the disclosure of which is incorporated herein by reference.

The water soluble salts of amphoteric metals of the type which are contemplated for the purpose of the invention are strong electrolytes and include, for example, zinc chloride, ferric chloride, lanthanum chloride, aluminum chloride, and aluminum sulphate.

The polycationic polymer is blended with the electrolyte salts of the amphoteric metal preferably in a weight ratio within the range of 0.2 to 3 parts by weight of the electrolyte salt per part of the polycationic polymer.

Blends of such electrolyte salts and polycationic polymers have heretofore been used in breaking oil-in-water emulsions and their effectiveness for this purpose may contribute to their effectiveness in the practice of the present invention. However, for the purpose of the present invention it is desirable to carry out the process by adjusting the pH of the water containing the blend of polycationic water dispersible polymer and electrolyte salt to a pH within the range of 7.0 to 11.0, preferably 7.5 to 9.5. This is accomplished by adding any suitable alkaline material such as an alkali metal hydroxide, e.g., sodium hydroxide, potassium hydroxide or soda ash. Usually it is preferable to employ sodium hydroxide because it is the least expensive. Other alkalis can be used but alkaline compounds that tend to form insoluble salts are less desirable.

THE IMPROVEMENT

In the use of the above compositions, serious problems have sometimes been encountered in that the sludge formed from the paint and lacquer particles tends to settle to the bottom of the tank too rapidly and oftentimes with these compositions, foaming has created serious process problems. We have found that by adding a small amount of a polypropylene glycol, having a molecular weight of from 100 to 1,000, to the water containing the polycationic polymer and the electrolyte salt of an amphoteric metal, the operational efficiency of these types of compounds can be increased. With the compounds of my invention, paint and lacquer sludge particles are much easier to collect, and do not immediately settle to the bottom, and foaming problems which sometimes may occur are adequately controlled. The problems being remedied by the invention provide great advantages over the use of the blend of the cationic polymer and the water soluble metallic salt used previously.

We generally prefer to add from 1-30 ppm of the polypropylene glycol to the paint spray booth system containing the cationic polymer and the compatible salt of an amphoteric metal. Preferably, we prefer to add from 5-25 ppm polypropylene glycol.

While the polypropylene glycol can be added to the water containing the cationic polymer and the metal salt, it may also be effectively added to a concentrate of the above composition. In the preferred embodiment of our invention, the polypropylene glycol is blended directly into a concentrate detackifying chemical blend containing the cationic polymer and the electrolyte salt of an amphoteric metal. This is done to insure the accuracy of measurement, and facilitates operations where the product will be used.

While we do not completely understand the ability of our invention to increase the efficiency of these compounds so dramatically, we believe that it is due to the characteristics of the water soluble polypropylene glycols employed. It is believed that these compounds act as frothers and wetting agents for the sludge and metal salt particles, and as defoamers at the alkaline pH's which we prefer to use in the practice of our invention. The water-soluble polypropyelene glycols which are the subject of the improvement have a molecular weight of from 100 to 1,000. In the preferred embodiment of our invention the polypropylene glycols have an average molecular weight of from 250 to 900. The most preferred average molecular weight for the polypropylene glycols which we prefer to use in our invention is from 200 to 800.

THE PROCESS

This invention is applicable to the treatment of water sprays in paint or lacquer spray booths regardless of the type of paint or lacquer. Thus the paint or lacquer may be a water based paint or an oil based paint which can include acrylic resins, rubber latex type polymers, nitrocellulose, polyester resins, ureaformaldehyde resins, melamine resins, and/or polyurethane resins.

The quantity of the blend of electrolyte salt, polycationic water dispersible polymer and polypropylene glycol added to the water can vary somewhat depending upon the water analysis and other factors, but it is usually within the range of 50 parts per million (ppm) to 500 ppm (active material). The amounts should be sufficient to reduce the tackiness of paints and lacquers and thereby reduce the tendency of over-sprayed paints and lacquers to adhere to walls, ceilings and floors of spray booths and they should also be sufficient to condition paint and lacquer solids removed with the water so that they can be separated from the water by settling, filtration or in some other manner and the water returned for recirculation in the process.

In a process of this type, it is usually customary to pump the water through conduits to the spray booth and the blend of electrolyte and polycationic polymer can be introduced to the water at any suitable point, preferably just ahead of or after the pump.

The invention will be illustrated but is not limited by the following examples:

EXAMPLE I

A composition useful for the detackification of paint and lacquer spray booth wastes would be formulated in the following manner: to a 12 liter flask equipped with a mechanical agitator was added 8,000 grams of Chicago tap water. To this would then be added 750 grams of a cationic polyamine of the type disclosed in U.S. Pat. No. 3,251,882, said polymer being derived from epichlorohydrin, a polyalkylene polyamine and a polyoxy alkylene glycol chloride. With stirring, 1,000 grams of zinc chloride was added followed by 250 grams of a commercially available polypropylene glycol having an average molecular weight of 400. This composition was stable after mixing, and after settling could be redispersed with only slight agitation.

Approximately 50 to 500 ppm of a blend of the above material (based on active ingredients) would be added to the water at a pump used to pump the water into a spray booth for the purpose of washing the air and removing oversprayed lacquer solids. A suspension of lacquer solids in water was withdrawn from the spray booth and would be pumped to a settling tank where it would form a sludge. After this sludge had attained a minimum of 8% solids it would be pumped to a vacuum filter and the filtrate would be recycled through the pump to the spray booth.

It would be found that the above composition would be effective for the detackification and clarification of paint and lacquer spray booth wastes with the benefit being that more wastes would be removed from the water then using a similar composition formulated in the same manner less the polypropylene glycol of our invention.

EXAMPLE II

The composition of Example I was compared directly against a similar composition not containing the polypropylene glycol in an automotive spray paint booth utilizing a high zinc prime composition. Both materials were added at a rate so that the percentage of cationic polymer and zinc chloride present in the paint spray booth wastes water system would be equal. These products were evaluated in an automotive spray booth. In a side by side comparison, with the same amount of spraying being done, and the same paint being used, 1 and ⅓ gondolas of sludge were removed using the compound less polypropylene glycol per day as compared to 2.5 gondolas of sludge using the improvement of our invention. This represents an almost 100% increase in the efficiency of compositions incorporating our improvement. Also, while paint residue from the run not utilizing polypropylene glycol was effectively detackified this material settled quickly to the bottom of the pump underneath the booth, while the composition employing the polypropylene glycol frothed the residue allowing for a much more satisfactory cleanup.

EXAMPLE III

An aqueous composition containing 5.0% by weight $ZnCl_2$, 5.0% by weight of a mixture obtained from the distillation residue of hexamethylene diamine and containing largely hexamethylene diamine and 2.5% by weight of polypropylene glycol 400 was prepared by blending the above ingredients with water.

This composition was added to an automotive paint spray booth utilizing a high zinc solvent based gray primer paint.

The booth selected had an approximate capacity of 25,000 gallons and this water was recirculated approximately every 10 minutes. The addition of 1.5 gallons of the above composition per hour to the booth resulted in the detackification of the oversprayed paint and the floating of the paint sludge on the surface of the water below the gratings in the booth. This flotation of the sludge resulted in decreased maintenance costs and less down time of the booth as compared to a similar composition not containing the polypropylene glycol.

Having thus described our invention, we claim the following:

1. In a process for controlling pollution and contamination in paint or lacquer spray booths in which water is used to wash the air in the spray booth and to remove over-sprayed paints or lacquers and solids are removed from the water which is then recirculated for further use in washing the air in the spray booth, of the type which comprises adding to said water a quantity of a blend of a water soluble electrolyte salt of an amphoteric metal and a polycationic water dispersible polymer, said quantity being sufficient to reduce the tackiness of paints and lacquers and thereby reduce the tendency of over-sprayed paints and lacquers to adhere to walls, ceilings and floors of said spray booths, said polymer also being effective to condition paint and lacquer solids removed with said water so that they can be separated from the water which is then returned for recirculation in the process, the improvement comprising adding to said water containing the blend of a water soluble electrolyte salt of an amphoteric metal and a cationic water dispersible polymer, from 1–30 ppm of a polypropylene glycol, said polypropylene glycol having an average molecular weight of from 100 to 1,000.

2. The improvement of claim 1 wherein the polypropylene glycol has an average molecular weight of from 200–800.

3. The improvement as claimed in claim 1 wherein the pH of said water containing said blend and polypropylene glycol is adjusted within the range of 7.0 – 11.0.

* * * * *